Figures 1, 2:
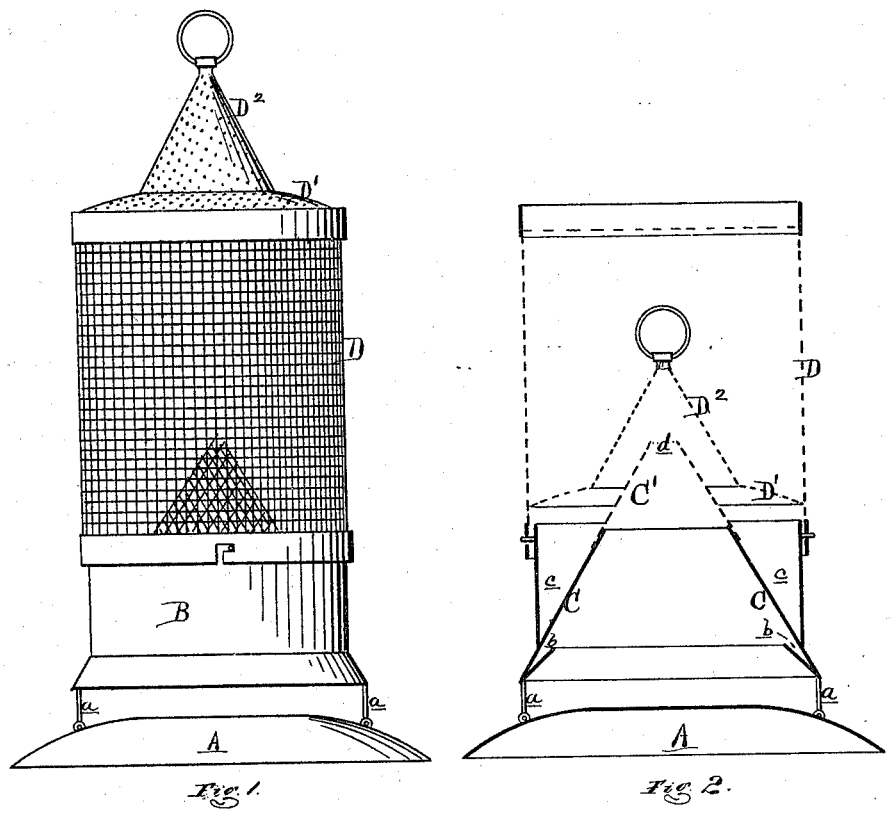

T. H. WHITING.
Fly-Traps.

No. 140,176.

Patented June 24, 1873.

ATTEST:
H. Sprague
H. F. Eberts

INVENTOR:
Thomas H. Whiting
By Attorney
Thos. S. Sprague

AM. PHOTO-LITHOGRAPHIC CO. N.Y. (OSBORNE'S PROCESS.)

UNITED STATES PATENT OFFICE.

THOMAS H. WHITING, OF GRAND HAVEN, MICHIGAN.

IMPROVEMENT IN FLY-TRAPS.

Specification forming part of Letters Patent No. 140,176, dated June 24, 1873; application filed May 8, 1873.

*To all whom it may concern:*

Be it known that I, THOMAS H. WHITING, of Grand Haven, in the county of Ottawa and State of Michigan, have invented a new and useful Improvement in Fly-Traps; and I do declare that the following is a true and accurate description thereof, reference being had to the accompanying drawings, and to the letters of reference marked thereon and being a part of this specification, in which:

Figure 1 is an elevation of my trap, and Fig. 2 is a vertical section of the same, with the sliding top pushed down to force the flies into the water to destroy them.

Like letters refer to like parts in both figures.

The nature of this invention relates to an improvement in fly-traps which are provided with a cone in the lower part, with a passage in its apex opening into a light-chamber in which the fles are imprisoned; and it consists, first, in the peculiar construction of the trap; and, secondly, in providing the light-chamber with a movable top, or follower, which is arranged to be pushed down to the water-basin in the lower part of the light-chamber, forcing the flies into the water to drown them.

In the drawing, A represents a circular sheet-metal base-plate convex in section. B is a sheet-metal cylinder, with a flaring bottom, supported a short distance above the base-plate by standards $a$. Within the flaring bottom is an annular trough, $b$, to contain sugar, molasses, or other bait, which will attract the flies. C is a truncated cone, of sheet-metal, soldered at its base to the inner wall of the cylinder B, above the trough $b$, the space above it forming a capacious annular trough, $c$. The cone is completed by a wire-cloth cone $c'$, with an aperture, $d$, at its apex, large enough to pass a fly with ease. D is a wire-cloth cylinder secured to a metal hoop at each end, the hoops being also connected with a metallic strip connecting them, to stiffen the structure and keep it in shape. The cylinder D is attached to the cylinder B by a lantern-joint. It is also provided with a perforated sheet-metal top, $D^1$, from the center of which rises a cone, $D^2$. The top is held in place by the pressure of the upper ring, but can easily be slipped down to the bottom of the light-chamber D, the cone $C'$ in the latter entering the cone $D^2$ of the top.

To catch flies, the trough $b$ should be provided with bait, and the trough $c$ filled with water, or preferably with soap-suds. The flies being attracted by the odor of the bait pass under the flaring bottom of the cylinder B, and seeing light above pass through the opening $d$ into the light-chamber, whence they do not seek escape through the only entrance, which is dark. When a sufficient number have been hived, the top is pushed down, which forces the flies into the water and drowns them, after which the top is detached, the flies emptied out, and the trap made ready to hive a fresh batch.

What I claim as my invention, and desire to secure by Letters Patent, is—

1. The chamber $D^2$ provided with the sliding or piston-top $D^1$, as and for the purpose set forth.

2. The construction and arrangement of the base-plate A, standard $a$, cylinder B, having secured within it the trough $b$, and cone C $C'$ provided with the aperture $d$, the detachable wire-cloth cylinder D, and the top $D^1$ $D^2$, substantially as and for the purpose set forth.

THOS. H. WHITING.

Witnesses:
H. E. FOSTER,
ALFRED KENT.